(12) United States Patent
Gan et al.

(10) Patent No.: US 6,353,080 B1
(45) Date of Patent: Mar. 5, 2002

(54) FLAME RETARDANT EPOXY RESIN COMPOSITION

(75) Inventors: Joseph Gan, Strasbourg (FR); Alan Goodson, Rheinmuenster (DE); Raymond A. Koenig, Vendenheim; John P. Everett, Buehl-Neusatz, both of (DE)

(73) Assignee: The Dow Chemical Company, Midland, MI (US)

(*) Notice: Subject to any disclaimer, the term of this patent is extended or adjusted under 35 U.S.C. 154(b) by 0 days.

(21) Appl. No.: 09/446,771
(22) PCT Filed: Jun. 25, 1998
(86) PCT No.: PCT/US98/13618
 § 371 Date: Mar. 20, 2000
 § 102(e) Date: Mar. 20, 2000
(87) PCT Pub. No.: WO99/00451
 PCT Pub. Date: Jan. 7, 1999

(30) Foreign Application Priority Data

Jun. 26, 1997 (GB) .............................. 9713526

(51) Int. Cl.[7] ...................... C08G 59/68; C08G 59/50
(52) U.S. Cl. .................. 528/89; 523/435; 525/526; 528/94; 528/108
(58) Field of Search .................... 528/94, 108, 89; 523/435; 525/526

(56) References Cited

U.S. PATENT DOCUMENTS

| | | | | |
|---|---|---|---|---|
| 3,998,789 A | * | 12/1976 | Yoshioka | 528/108 X |
| 4,572,870 A | * | 2/1986 | Vasta | 523/435 X |
| 4,902,732 A | * | 2/1990 | Itoh et al. | 523/435 X |
| 4,925,901 A | | 5/1990 | Bertram et al. | |
| 4,952,646 A | * | 8/1990 | Weil et al. | 528/108 X |
| 5,036,135 A | | 7/1991 | von Gentzkow et al. | |
| 5,112,932 A | | 5/1992 | Koenig et al. | |
| 5,364,893 A | | 11/1994 | von Gentzkow et al. | |
| 5,376,453 A | | 12/1994 | von Gentzkow et al. | |
| 5,560,934 A | * | 10/1996 | Afzali-Ardakani et al. | 528/94 X |
| 5,587,243 A | | 12/1996 | von Gentzkow et al. | |
| 5,759,690 A | | 6/1998 | von Gentzkow et al. | |
| 5,817,736 A | | 10/1998 | von Gentzkow et al. | |
| 5,900,469 A | * | 5/1999 | Kleiner et al. | 528/108 X |

FOREIGN PATENT DOCUMENTS

| | | |
|---|---|---|
| EP | 0 029 683 | 6/1981 |
| EP | 0 458 502 A2 | 11/1991 |
| EP | 0 526 488 B1 | 2/1993 |
| GB | 950150 | 2/1964 |
| GB | 1 443 114 | 7/1976 |

OTHER PUBLICATIONS

Derwent Abstract EP 754728, Jun. 1, 2000.
Derwent Abstract GB 9421405.3, Jun. 1, 2000.
Derwent Abstract DE 4308184, Jun. 1, 2000.
Derwent Abstract DE 4308185, Jun. 1, 2000.
Derouet D. et al., "Chemical Modification of Epoxy Resins by Dialkyl (or Aryl) Phosphates: Evaluation of Fire Behavior and Thermal Stability" Journal of Applied Polymer Science, vol. 62, No. 11, p. 1855–1868 (1996).
vol. 6 Encyclopedia of Poly. Science & Eng., "Epoxy Resins" p. 348–356 (J. Wiley & Sons 1986).
Liu Y–L. et al., "Phosphorus–Containing Epoxy for Flame Retardant. III: Using Phosphorylated Diamines as Curing Agents", Journal of Applied Polymer Science, vol. 64, No. 7, p. 895–901 (1997).
"Flame Retardants—101 Basic Dynamics—Past Efforts Create Future Opportunities," Fire Retardant Chemicals Association, Baltimore Marriot Inner Harbor Hotel, Baltimore, Maryland, Mar. 24–27, p. 13–87 (1996).

* cited by examiner

Primary Examiner—Richard D. Lovering

(57) ABSTRACT

A flame retardant epoxy resin composition containing not more than 10% by wgt. of halogen, comprising an epoxy resin, stated concentrations of phosphoric acid ester, nitrogen—containing cross-linking agent having an amine functionality of at least 2 and a catalyst capable of promoting the reaction of the phosphoric acid ester with the epoxy resin and promoting the curing of the epoxy resin with the cross-linker, and optionally a Lewis acid in a stated amount.

30 Claims, No Drawings

FLAME RETARDANT EPOXY RESIN COMPOSITION

"This application is a 371 of PCT/US98/13618 filed Jun. 25, 1998."

The present invention relates to curable epoxy-resin-containing formulations, and particularly to formulations useful for making laminates for printed wiring boards.

It is known to make electrical laminates and other composites from a fibrous reinforcement and an epoxy-containing matrix resin. Examples of suitable processes usually contain the following steps:

(1) an epoxy-containing formulation is applied to a substrate by rolling, dipping, spraying, other known techniques and/or combinations thereof. The substrate is typically a woven or nonwoven fiber mat containing, for instance, glass fibers.

(2) The impregnated substrate is "B-staged" by heating at a temperature sufficient to draw off solvent in the epoxy formulation and optionally to partially cure the epoxy formulation, so that the impregnated substrate can be handled easily. The "B-staging" step is usually carried out at a temperature of from 90° C. to 210° C. and for a time of from 1 minute to 15 minutes. The impregnated substrate that results from B-staging is called a prepreg. The temperature is most commonly 100° C. for composites and 130° C. to 200° C. for electrical laminates.

(3) One or more sheets of prepreg are stacked in alternating layers with one or more sheets of a conductive material, such as copper foil, if an electrical laminate is desired.

(4) The laid-up sheets are pressed at high temperature and pressure for a time sufficient to cure the resin and form a laminate. The temperature of lamination is usually between 100° C. and 230° C., and is most often between 165° C. and 190° C. The lamination step may also be carried out in two or more stages, such as a first stage between 100° C. and 150° C. and a second stage at between 165° C. and 190° C. The pressure is usually between 50 N/cm$^2$ and 500 N/cm$^2$. The lamination step is usually carried on for from 1 to 200 minutes, and most often for 45 to 90 minutes. The lamination step may optionally be carried out at higher temperatures for shorter times (such as in continuous lamination processes) or for longer times at lower temperatures (such as in low energy press processes).

(5) Optionally, the resulting copper-clad laminate may be post-treated by heating for a time at high temperature and ambient pressure. The temperatures of post-treatment are usually between 120° C. and 250° C. The post-treatment time usually is between 30 minutes and 12 hours.

It is conventional in the preparation of epoxy-containing laminates to incorporate into the epoxy resin composition various additives to improve the flame-retardancy of the resulting laminate. Many types of flame retardant additives have been suggested, but the additives which are most widely used commercially are halogen containing additives, such as tetrabromodiphenylolpropane, or epoxy resins prepared by reacting diglycidyl ether of bisphenol-A with tetrabromodiphenylolpropane. Typically, in order to reach the desired fire retardancy level (V-0 in the standard "Underwriters Laboratory" test method UL 94) levels of such compounds are required which provide a bromine content of from 10 to 25 weight percent based on the total polymer weight in the product.

Although halogen containing fire-retardant additives are effective, they are considered by some to be undesirable from an environmental standpoint, and in recent years there has been increasing interest in the formulation of halogen-free epoxy resins, which are able to meet the fire retardancy requirements.

Proposals have been made to use phosphorus based flame retardants instead of halogenated fire retardants (see, for example EP-A-0384939, EP-A-0384940, EP-A-0408990, DE-A-4308184, DE-A-4308185, DE-A-4308187, WO-A-96/07685, and WO-A-96/07686. In these formulations the phosphorus flame retardant was pre-reacted to form a di or multifunctional epoxy resin. This makes the epoxy resin relatively expensive.

The phosphonic acid esters are commercially available fire retardant materials (e.g., Amgard™ V19 and Amgard™ P45—supplied by Albright and Wilson Ltd, United Kingdom). These phosphonic acid esters, may be solids or liquids. Alkyl and aryl substituted phosphonic acid esters are compatible with epoxy resins. In particular lower (i.e., $C_1$–$C_4$) alkyl esters of phosphonic acid are of value because they contain a high proportion of phosphorus, and are thus able to impart good fire retardant properties upon resins in which they are incorporated. However, it has been found by the present inventors that they are not satisfactory as a substitute for halogenated flame retardants in epoxy resins for the production of electrical laminates, because their use in amounts sufficient to provide the necessary flame retardancy increases the tendency of the resulting cured epoxy resin to absorb moisture. The moisture absorbency of the cured laminate board is very significant, because laminates containing high levels of moisture tend to blister and fail, when introduced to a bath of liquid solder at temperatures around 260° C., a typical step in the manufacture of printed wiring boards.

EP-A-0754728 describes the production of flame retardant epoxy resin systems by blending epoxy resins with phosphonic acid esters and incorporating them into the cured resin. This reference indicates that large quantities (in excess of 18 weight percent) of the phosphorus additive are needed in order for the resin system to meet UL 94 V-0.

We have now discovered that it is possible to produce epoxy resins which meet the desirable standards of fire retardancy without the need for halogen-containing flame retardants, or at least employing significantly lower levels of such halogen-containing flame retardants than is conventional in the art, by employing relatively low levels of phosphonic acid ester flame retardant (to give 0.2 to 5 weight percent phosphorus in the solid resin), together with particular combinations of accelerator and catalyst, and, in preferred embodiments, particular types of epoxy resin. The accelerators and catalysts are generally known per se, but their use in conjunction with low levels of phosphonic acid ester fire retardants to obtain compositions which have both good fire retardancy, and yet sufficiently low water absorption has not hitherto been described.

According to the invention, there is provided a flame retardant epoxy resin composition containing no more than 10% by weight of halogen, comprising a) an epoxy resin, b) a phosphonic acid ester in an amount such as to provide from 0.2 to 5 weight percent phosphorus in the composition, c) a nitrogen-containing crosslinking agent having an amine functionally of at least 2, in an amount of from 10 to 80 percent of the stoichiometric amount needed to cure the epoxy resin, d) from 0.1 to 3 weight percent of a catalyst capable of promoting the reaction of the phosphonic acid ester with the epoxy resin and promoting the curing of the epoxy resin with the crosslinker, and optionally, e) a Lewis acid in an amount of up to 2 moles, per mole of catalyst.

The phosphonic acid ester employed in the present invention is preferably an ester of the formula

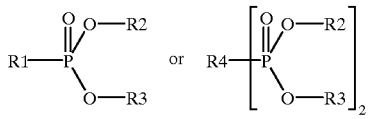

wherein $R^1$ is $C_1$ to $C_3$ alkyl, $R^4$ is $C_1$ to $C_3$ alkylene, $R^2$, and $R^3$, are each $C_1$ to $C_3$ alkyl, or $C_6$ to $C_{10}$ aryl, or $R^2$ and $R^3$ taken together represent the residue of a glycol or a polyol.

Preferred phosphonic acid esters are for example esters of methanephosphonic acid with polyhydroxy compounds such as glycols, and polyols. Such phosphonic acid esters of polyhydroxy compounds can have polymeric and/or cyclic structures.

Specific preferred examples are polymers with repeating units such as:

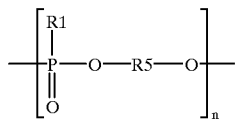

and/or cyclic structures such as

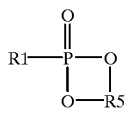

n is 2 to 10, $R^5$ is a $C_1$ to $C_3$ alkylene group or the residue of a glycol or polyol,

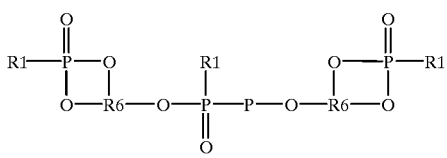

$R^6$ is the residue of a triol, for example glycerol or trimethylol propane.

The phosphonic acid ester is preferably an ester having methyl or methylene adjacent to phosphorous. Preferred phosphonic acid esters are those of the formula,

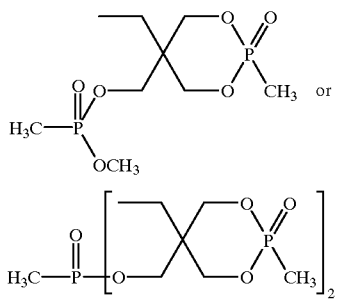

In order to obtain satisfactory resistance to water absorption, it is important that the amount of the phosphonic acid ester is from 1 to 18 weight percent, preferably from 4 to 15 weight percent, more preferably from 7 to 15 weight percent, based on the total of the epoxy resin composition. The phosphonic acid ester content is preferably such as to provide a total phosphorous content in the composition, of from 0.2 to 5 weight percent, more preferably from 1 to 5 weight percent.

The compositions of the invention contain a catalyst capable of promoting the reaction of the phosphonic acid ester with the epoxy resin and promoting the curing of the epoxy resin.

The catalyst may comprise a single catalyst component, capable both of promoting the reaction of the phosphonic acid ester with the epoxy resin and of promoting the curing of the epoxy resin. Alternatively, the catalyst may be a combination of components which favor one aspect of the resin curing over another.

Examples of suitable catalyst materials include compounds containing or amine, phosphine, ammonium, phosphonium, arsonium or sulfonium moieties. Particularly preferred catalysts are the heterocyclic nitrogen containing compounds. Preferably a Lewis acid is also employed, especially when the catalyst is an amine, particularly a heterocyclic nitrogen containing amine. Catalysts (as distinguished from cross-linkers) preferably contain on average no more than about 1 active hydrogen moiety per molecule. Active hydrogen moieties include hydrogen atoms bonded to an amine group, a phenolic hydroxyl group, or a carboxylic acid group. For instance, the amine and phosphine moieties in catalysts are preferably tertiary amine or phosphine moieties; and the ammonium and phosphonium moieties are preferably quaternary ammonium and phosphonium moieties.

Among preferred tertiary amines that may be used as catalysts are those mono- or polyamines having an open-chain or cyclic structure which have all of the amine hydrogen replaced by suitable substituents, such as hydrocarbyl radicals, and preferably aliphatic, cycloaliphatic or aromatic radicals.

Examples of these amines include, among others, methyl diethanol amine, triethylamine, tributylamine, dimethyl benzylamine, triphenylamine, tricyclohexyl amine, pyridine and quinoline. Preferred amines are the trialkyl, tricycloalkyl and triaryl amines, such as triethylamine, triphenylamine, tri-(2,3-dimethylcyclohexyl)amine, and the alkyl dialkanol amines, such as methyl diethanol amines and the trialkanolamines such as triethanolamine. Weak tertiary amines, for example, amines that in aqueous solutions give a pH less than 10 in aqueous solutions of 1 M concentration, are particularly preferred. Especially preferred tertiary amine catalysts are benzyldimethylamine and tris-(dimethylaminomethyl) phenol.

Examples of suitable heterocyclic nitrogen catalysts include those described in U.S. Pat. No. 4,925,901. Preferable heterocyclic secondary and tertiary amines or nitrogen-containing catalysts which can be employed herein include, for example, imidazoles, benzimidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines and combinations thereof. Especially preferred are the alkyl-substituted imidazoles; 2,5-chloro-4-ethyl imidazole; and phenyl-substituted imidazoles, and mixtures thereof. Even more preferred are N-methylimidazole; 2-methylimidazole; 2-ethyl-4-methylimidazole; 1,2-dimethylimidazole; and 2-methylimidazole. Especially preferred is 2-phenylimidazole.

Examples of heterocyclic nitrogen donor compounds which are preferably used in combination with Lewis acids are those described in EP-A-526488, EP-A-0458502- & GB-A-9421405.3. In these references the Lewis acids are described as inhibitors because they reduce the initial rate of the chemical reaction. Examples of suitable Lewis acids include halides, oxides, hydroxides and alkoxides of zinc, tin, titanium, cobalt, manganese, iron, silicon, aluminium, and boron, for example Lewis acids of boron, and anhydrides of Lewis acids of boron, for example boric acid, metaboric acid, optionally substituted boroxines (such as trimethoxyboroxine), optionally substituted oxides of boron, alkyl borates, boron halides, zinc halides (such as zinc chloride) and other Lewis acids that tend to have a relatively weak conjugate base. Preferably the Lewis acid is a Lewis acid of boron, or an anhydride of a Lewis acid of boron, for example boric acid, metaboric acid, an optionally substituted boroxine (such as trimethoxy boroxine, trimethyl boroxine or triethyl boroxine), an optionally substituted oxide of boron, or an alkyl borate. The most preferred Lewis acid is boric acid.

These Lewis acids are very effective in curing epoxy resins when combined with the heterocyclic nitrogen containing compounds, referred to above. In particular, they are able to incorporate the phosphonic acid ester into the epoxy resin during curing.

The Lewis acids and amines can be combined before mixing into the formulation or by mixing with the catalyst in-situ, to make a curing catalyst combination.

The amount of the Lewis acid employed is preferably at least 0.1 moles of Lewis acid per mole of heterocyclic nitrogen compound, more preferably at least 0.3 moles of Lewis acid per mole of heterocyclic nitrogen compound.

The formulation preferably contains no more than three moles of Lewis acid per mole of catalyst and more preferably contains no more that 2 moles of Lewis acid per mole of catalyst. The total amount of the catalyst is from 0.1 to 3 weight percent, based on the total weight of the composition, preferably from 0.1 to 2 percent.

All of the aforementioned catalyst materials will catalyse to some extent both the reaction of the phosphonic acid ester with the epoxy resin, and the curing of the epoxy resin. However, (1,8-diazabicyclo (5,4,0) undec-7-en (DBU) tends to favor the phosphonic ester-epoxy reaction over the epoxy curing reaction.

The nitrogen-containing crosslinking agent has an amine functionality of at least 2. Suitable multifunctional crosslinkers are described in numerous references such as Vol. 6 Encyclopaedia of Poly. Sci. & Eng., "Epoxy resins" at 348-56 (J. Wiley & Sons 1986). Examples of suitable nitrogen-containing cross-linkers include polyamines, polyamides, sulphanilamide, diaminodiphenylsulfone and diaminodiphenyl methane. The preferred crosslinking agent is dicyandiamide.

The amount of the nitrogen-containing crosslinking agent is from 10 to 80 percent of the stoichiometric quantity needed to cure the epoxy content of the epoxy resin in the formulation.

The total amount of nitrogen in the composition (including nitrogen derived from any nitrogen-containing compounds which may form part of the catalyst, or advancement monomers for the epoxy resin) is preferably from 1 to 8 percent by weight.

The quantity of nitrogen-containing cross-linking agent is preferably such that the formulation contains a stoichiometric excess of epoxy resin over the nitrogen-containing cross-linking agent. (For the purposes of this application, dicyandiamide is taken as having 6 curing sites per molecule.) The formulation thus contains no more than 0.8 equivalents, preferably no more than 0.75, more preferably no more than 0.6, and most preferably no more than 0.5 equivalents of nitrogen-containing cross-linking agent per epoxide equivalent. When the multifunctional cross-linker is dicyandiamide, the formulation preferably contains at least 0.65 weight percent and more preferably at least 1.9 weight percent of dicyandiamide. The amount of dicyandiamide is preferably no more than 5.2 weight percent and more preferably no more than 2.6 weight percent.

The epoxy resin used in the present invention is a material which possesses on average more than 1 and preferably at least 1.8, more preferably at least 2 epoxy groups per molecule. In the broadest aspect of the invention, the epoxy resin may be any saturated or unsaturated aliphatic, cycloaliphatic, aromatic or heterocyclic compound which possesses more than one 1,2-epoxy group. Examples of heterocyclic epoxy compounds are diglycidylhydantoin or triglycidyl isocyanurate (TGIC).

The epoxy resin is preferably one which has no lower alkyl aliphatic substituents, for example the glycidyl ether of a phenol novolac, or the glycidyl ether of bisphenol-F.

The most preferred epoxy resins are epoxy novolac resins (sometimes referred to as epoxidised novolac resins, a term which is intended to embrace both epoxy phenol novolac resins and epoxy cresol novolac resins). Such compounds have the following general formula:

Formula II

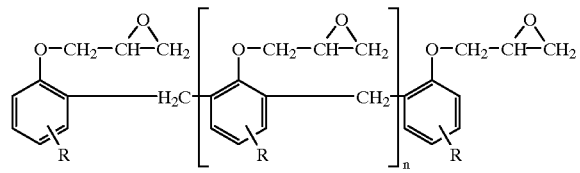

wherein "R" is hydrogen or a C1–C3 alkyl, e.g., methyl and "n" is 0 or an integer from 1 to 10.

Epoxy novolac resins (including epoxy cresol novolac resins) are readily commercially available, for example under the trade names D.E.N.™, Quatrex™, Tactix™, (Trademarks of The Dow Chemical Company). The materials of commerce generally comprise mixtures of various species of the above formula and a convenient way of characterizing such mixtures is by reference to the average, n', of the values of n for the various species. Preferred epoxy novolac resins for use in accordance with the present invention are those in which n', has a value of from about 2.05 to about 10, more preferably from about 2.5 to about 5.

Preferably the epoxy resin is the reaction product of an epoxy compound containing at least two epoxy groups for example an epoxy compound of the kind describe above, and a chain extender. The chain extending monomer may be a phenolic chain extender containing on average more than one, and less than three phenolic hydroxyl groups per molecule. Such phenolic chain extenders preferably contain on average 1.8 to 2.1 phenolic hydroxyl groups and more preferably contains about 2 phenolic hydroxyl groups per molecule. The phenolic chain extender is preferably a dihydric phenol. The chain extender is preferably reacted with the epoxy compound to form the epoxy resin before formulation of the composition with the flame retardant, hardener and the catalyst. However it is also possible to add the chain extender and the epoxy resin compound to the composition in order to form the epoxy resin in-situ.

The epoxy resin is preferably one which is solid at 20 degrees C., for example one which has a softening point of 50° C. or higher, as defined by the Mettler softening point method ASTM D3104 and DIN 51920. The phenolic chain extender may itself be the reaction product of a diol and an epoxy compound.

For example, it may be the reaction product of a diol or a compound containing two phenolic groups, with a glycidyl ether of a phenol novolac or with a glycidyl ether of bisphenol-F. Preferably, less than 50 percent of the carbon atoms in the chain extender are present in aliphatic groups, more preferably less than 30 percent, and most preferably 0 percent.

Examples of particularly suitable phenolic chains extenders include resorcinol, catechol, hydroquinone, bisphenol, bisphenol A, bisphenol AP (1,1-bis(4-hydroxyphenyl)-1-phenylethane), bisphenol F, and bisphenol K.

It is greatly preferred however that the chain extender is a nitrogen-containing monomer for example, an isocyanate, and amine or amide.

Preferred nitrogen-containing chain extenders include, polyisocyanate compounds which form epoxy-terminated polyoxazolidones as described in U.S. Pat. No. 5,112,932. Preferably, the polyisocyanate compound used in the present invention is methylene bis(phenylisocyanate) (MDI). MDI is preferably employed in its commercially available form, which includes, pure 4-4, MDI, isomers and functional homolog mixtures (commonly designated as "polymeric MDI"). Isocyanate compounds also useful in the present invention include, for example, toluene diisocyanate (TDI) and isomers thereof.

The nitrogen-containing chain extender may also be, for example an amine- or amino amide-containing compound which forms epoxy-terminated amine compounds having two N—H bonds capable of reacting with an epoxy group. Amine-containing compounds useful in the present invention include, for example, mono-primary amines of the general formula R-NH2 wherein R is alkyl, cycloalkyl or aryl moieties; di-secondary amines of the general formula R—NH—R'—NH—R" wherein R, R' and R" are alkyl, cycloalkyl or aryl moieties; and heterocyclic di-secondary amines wherein one or both of the N atoms is part of a nitrogen containing heterocyclic compound such as:

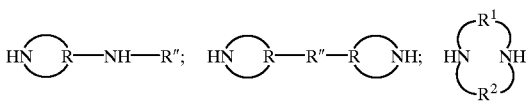

For reactivity reasons, and in order to better control the epoxy advancement reaction with the di-functional amines, di-secondary amines or primary amines having sterically hindered amine groups are preferred as for example 2,6-dimethyl cyclohexylamine or 2,6-xylidine (1-amino-2,6-dimethylbenzene).

Amino amide-containing compounds useful as chain extenders in the present invention include for example derivatives of carboxylic acid amides as well as derivatives of sulfonic acid amides having additionally one primary or two secondary amino groups. Preferred examples of such compounds are amino-aryl carboxylic acid amides and amino-arylsulfonamides. A preferred compound of this group is, for example, sulfanilamide (4-amino benzenesulfonamide) and anthranilamide(2-aminobenzamide).

The amount of the chain extender is preferably from 5 to 30 weight percent, based on the epoxy resin.

The compositions of the invention may also contain one or more additional flame retardant additives, for example red phosphorous or liquid or solid phosphorus containing compounds, for example, ammonium polyphosphate, a phosphite, or 9,10-dihydro-9-oxa-phosphaphenanthrene-10-oxide (HCA), phosphazenes, nitrogen containing fire retardants and/or synergists, for example melamines, urea, cynamide, guanidine, cyanuric acid, isocyanuric acid and derivatives of those nitrogen containing compounds, halogenated flame retardants, halogenated epoxy resins (especially brominated epoxy resins) synergistic phosphorus-halogen containing chemicals or compounds containing salts of organic acids, inorganic metal hydrates, boron or antimony. Examples of suitable additional flame retardant additives are given in a paper presented at "Flame retardants—101 Basic Dynamics—Past efforts create future opportunities", Fire Retardants Chemicals Association, Baltimore Marriot Inner Harbour Hotel, Baltimore Md., Mar. 24–27 1996. When additional fire retardants are present which contain phosphorous, they are generally present in amounts such that the total phosphorous content of the epoxy resin composition is from 0.2 to 5 weight percent.

The compositions of the invention can be produced by mixing all the components together in any order. Preferably compositions of the invention can be produced by preparing a first composition comprising the epoxy resin, and the second composition comprising the curing catalyst. Either the first or the second composition also comprises the phosphonic acid ester, nitrogen-containing crosslinking agents. All other components may be present in the same composition, or some may be present in the first, and some in the second. The first composition is then mixed with the second composition, and cured to produce a fire retardant epoxy resin.

A number of preferred embodiments of the invention are illustrated, in the following specific Examples.

Preparation A

General Production Procedure for the Epoxy Resin
(a) With High Nitroaen Content 92.5 parts by weight of a commercially available epoxy novolac resin with a functionality of 3.6 (D.E.N. 438) was heated up to 100° C. under nitrogen purge in a reactor equipped with an electrically driven stirrer, air and nitrogen inlets, sample port, condenser and thermocouple. 1500 ppm (based on the total of epoxy novolac resin and isocyanate in the product) of 1,8-diazabicyclo(5,4,0) undec-7-en (a reaction catalyst AMICURE DBU-E™ by Anchor) was added and the mixture and was heated to 130–140° C. 7.5 parts MDI (ISONATE™ M143 available from The Dow Chemical Company) was charged into the epoxy resin via an additional funnel, portion by portion. The reaction temperature rose to at least 150° C. by the heat of reaction. After the end of the addition, the reaction mixture was increased to 165° C. and maintained until the target epoxy equivalent weight of the copolymer of MDI and epoxy novalac resin was reached. The solid resin was further diluted with methylethylketone and propylene glycol monomethyl ether ( ) (50/50) to a 80 weight percent solid solution and cooled to room temperature.
Preparation B

General Production Procedure for Hardener Solutions

A phosphonic acid ester fire retardant (Amgard P45 or Amgard V19) was heated to 120° C. under nitrogen purge in a reactor equipped with an electrically driven mechanical stirrer, air and nitrogen inlets, sample port, condenser and thermocouple. Dicyandiamide or sulfanilamide was added and stirred until homogeneous mixture was obtained. Propylene glycol monomethyl ether was added to the mixture to make an 80 weight percent solids solution. Optionally the insoluble fire retardant additives were added to the hardener solution before adding it to the resin solution.

Production Procedure for the Polyepoxy/Polyisocyanate/HCA Copolymer ("resin A")

3.77 weight percent of 9,10-dihydro-9-oxa-phospha-phenanthrene-10-oxide (HCA) was added to 96.23 weight percent of the solid epoxy resin produced in Preparation A at about 160° C. and held until a target EEW of 232 was reached. The solid was cooled to about 130° C. and methylethylketone and propylene glycol monomethyl ether (50/50) were added to make a solution of 75 weight percent solid content.
Example 1—Preparation of "resin B" Boric acid in methanol was added to the D.E.N. 438/MDI copolymer. When the mixture was complete the phosphoric acid ester Amgard V19) flame retardant was mixed into the resin. 2-methylimidazole catalyst was added the resin solution. Lastly the dicyandiamide (7.5 weight percent in a 50/50 mixture of dimethylformamide and propylene glycol mono methyl ether was mixed in. The composition of the formulation and the properties of the formulation, prepregs and laminates made therefrom are given in the following table.

Preparation of Resins A and C to N

The epoxy resin solution, the hardener solution, the catalyst solution (usually 50 weight percent solution in methanol) and optionally boric acid solution were mixed at room temperature with a mechanical stirrer for 15 minutes to make a homogeneous mixture. Additional solvents (methylethylketone) was added to adjust the varnish viscosity to 30–50 sec. on Ford cup N° 4. The varnishes were aged overnight.

The varnishes were used to impregnate glass web (style Nr. 7628/36 amine silane finish by Porcher SA, France), using a Caratsch pilot treater (3 m long). The temperature of the hot air in the oven was 160–170° C. The varnish composition, treater condition, prepreg and laminate performance are summarized in Tables 1, 2, 3 and 4.

The IPC test methods employed are the electrical laminate industry standard (The Institute For Interconnection And Packaging Electronic Circuits, 3451 Church Street, Evanston, Ill. 60203), as follows.

| Method | IPC-Test Method Number: |
|---|---|
| Reactivity (varnish) | IPC-TM-650-5.1.410 |
| Rest Geltime @ 170 c, sec | IPC-TM-650-2.3.18 |
| Mil Flow, wt. % | IPC-TM-650-2.3.17 |
| Tg, ° C. | IPC-TM-650-2.4.25 |
| Copper peel strength | IPC-TM-650-2.4.8 |
| NMP-pick-up | Dow method C-TS-AA-1012.00 |
| Pressure Cooker Test, wt. % water pick-up & % passed solder bath @ 260° C. | IPC-TM-650-2.6.16 |
| UL94 Flammability | IPC-TM-650-2.3.10 |

TABLE 1

Formulations composition, properties, prepreg and laminate performance

| COMPOSITION in parts solid by weight | B | C | D | E |
|---|---|---|---|---|
| Resin of Preparation A | 86 | 84 | 84 | |
| epoxy novolac resin, functionality 3.6 | | | | 85 |
| Amgard V19 | 14 | | 14 | |
| Amgard P45 | | 14 | | 14 |
| Dicyandiamide dissolved in Amgard P45 or Amgard V19) | | 2 (in Amgard P45) | 2 (in Amgard V19) | 2 (in Amgard P45) |
| B | | | | |
| Boric acid | 1 | 0.3 | | — |
| 2-Phenylimidazole | | 1.7 | 2 | 1 |
| 2-Methylimidazole | 1 | | | |
| Additional solvent | | MEK | MEK | MEK |
| Dicyandiamide solution (7.5 wt %) | 1 | | | |

TABLE 1-continued

Formulations composition, properties, prepreg and laminate performance

| COMPOSITION in parts solid by weight | B | C | D | E |
|---|---|---|---|---|
| VARNISH CHARACTERISTICS | | | | |
| Viscosity (Ford cup #4), sec | 76 | 38 | 126 | 36 |
| Reactivity, sec | | | | |
| Geltime | | | | |
| @ 170° C. | 85 | 102 | 151 | 109 |
| @ 150° C. | | 242 | | 322 |
| Treater conditions | | | | |
| Oven temp. ° C. | 185 | 168 | 152 | |
| Winding speed, m/min | 2.3 | 1.4 | 1.1 | |
| Prepreg characteristics | | | | |
| Resin content, wt. % | 41 | 43.4 | 45 | 42.6 |
| Rest Geltime @ 170° C., sec | melted | 10 | 14 | 15 |
| Mil Flow, wt. % | 10 | 10.5 | 15 | 15.3 |
| LAMINATE PERFORMANCE | | | | |
| Laminate cure cycle | 1 hour @ 170° C. 1 hour @ 230° C. | 1 hour @ 170° C. 1 hour @ 230° C. | 100 mins @ 200° C. 90 mins @ 230° C. | 1 hour @ 170° C. 1 hour @ 230° C. |
| Laminate thickness, mm | 1.4–1.5 | 1.52–1.57 | 1.7–1.8 | 1.47–1.70 |
| Glass transition temperature — Tg1/2, ° C. | 158/159 | 158/162 | 149/146 | not measured |
| Press Cooker Test, wt. % water pick-up/% passed solder bath @ 260° C. | wt %/% pass | wt %/% pass | wt %/% pass | wt %/% pass |
| 30 min. | 0.38/100 | n.d./100 | 0.53/100 | |
| 40 min. | | | | |
| 50 min. | 0.53/100 | | | |
| 60 min. | | 0.64/100 | | 0.60/100 |
| Total burning time, sec | 69 & 35 | 36 | 30 | 46 |
| UL94 | V-1 & V-0 | V-0 | V-0 | V-0 |

TABLE 2

Formulation compositions, properties, prepreg and laminate performance

| COMPOSITION in parts solid by weight | F | G | Resin A |
|---|---|---|---|
| Resin of Preparation A | 79.5 | 83.5 | |
| Resin of Preparation A-SANKO/HCA | | | 81.5 |
| Amgard P45 | 14 | 14 | 12 |
| Dicyandiamide (Dissolved in Amgard P45) | | 2 | |
| Sulfanilamide (Dissolved in Amgard P45) | 6 | | 6 |
| Boric acid | 0.5 | 0.5 | 0.5 |
| 2-Phenylimidazole | 2.0 | 2.0 | 2.0 |
| Additional solvent | MEK | MEK | MEK |
| VARNISH CHARACTERISTICS | | | |
| Viscosity (Ford cup #4), sec | 45 | 39 | 45 |
| Reactivity, sec | 90 | 87 | 132 |
| Geltime @ 170° C. | 240 | 220 | — |
| @ 150° C. | | | |
| Treater conditions | | | |
| Oven temp. ° C. | 163 | 163 | 161 |
| Winding speed, m/min | 1.2 | 1.1 | 0.7 |
| PREPREG CHARACTERISTICS | | | |
| Resin content, wt. % | 45 | 44 | 45 |
| Rest Geltime @ 170° C., sec | 8 | 10 | 24 |
| Mil Flow, wt. % | 13 | 15 | 21 |
| LAMINATE PERFORMANCE | | | |
| Laminate cure cycle | 90 min @190° C. | | |
| Laminate thickness, mm | 1.6–1.7 | 1.6–1.8 | 1.57–1.70 |
| Glass transition temperature-Tg1/2, C | 160/166 | 161/167 | 157/160 |
| Copper peel strength N/cm | 15.7 | 17.0 | 16.3 |
| NMP-pick-up, % | | | 0.08 |
| Press Cooker Test, | wt %/% | wt %/% | wt %/% |

TABLE 2-continued

Formulation compositions, properties, prepreg and laminate performance

| COMPOSITION in parts solid by weight | F | G | Resin A |
|---|---|---|---|
| wt. % water pick-up & % passed solder bath @260° C. | pass | pass | pass |
| 40 min. | 0.52/100 | 0.6/75 | 0.53/100 |
| 60 min. | 0.64/75 | 0.75/75 | 0.69/50 |
| Total burning time, sec | 53 | 47 | 34 |
| UL94 | V-1 | V-0 | V-0 |

TABLE 3

Varnish compositions, properties, prepregs and laminates performance obtained from 2-methylimidazole catalysed system.

| COMPOSITION in parts solid by weight | I | J |
|---|---|---|
| Resin of Preparation A | 85 | 86 |
| Amgard V19 | 14 | 14 |
| Dicyandiamide (Dissolved in Amgard V19) | 1 | 1 |
| Boric acid | 1 | — |
| 2-Methylimidazole | 1 | 1 |
| Additional solvent | MEK | MEK |
| VARNISH CHARACTERISTICS | | |
| Viscosity (Ford cup #4), sec | 132 | 137 |
| Reactivity, sec Geltime @ 170° C. @ 150° C. | 109 / 178 | 70 / 150 |
| Treater conditions | | |
| Oven temp. ° C. | 160 | 160 |
| Winding speed, m/min | 0.8 | 1.3 |
| Prepreg characteristics | | |
| Resin content, wt. % | 45.1 | 41.2 |
| Rest Geltime @ 170 c, sec | 0 | 9 |
| Mil Flow, wt. % | 17.0 | 18.0 |
| LAMINATE PERFORMANCE | | |
| Laminate cure cycle | 90 min. @230° C. | |
| Laminate thickness, mm | 1.6–1.7 | 1.40–1.48 |
| Glass transition temperature-Tg1/2, C | 166/169 | 143/148 |
| Press Cooker Test, wt. % water pick-up & % passed solder bath @260° C. | wt %/% pass | wt %/% pass |
| 40 min. | 0.57/100 | 0.55/100 |
| 60 min. | 0.77/0 | 0.75/0 |
| Total burning time, sec | 54 | 49 |
| UL94 | V-1 | V-0 |

TABLE 4

Formulation compositions, properties, prepreg and laminate performance of filler containing systems

| COMPOSITION in parts solid by weight | K | L | M |
|---|---|---|---|
| Resin of Preparation A | 84.00 | 84.00 | 74.50 |
| Amgard P45 | 10.00 | 10.00 | 10.00 |
| Dicyandiamide (Dissolved in P45) | 2.00 | 2.00 | |
| Sulfanilamide (Dissolved in P45) | | | 6.00 |
| Hostaflam ™ AP 423 Ammonium Polyphosphate | 5.00 | | 7.00 |
| Hostaflam TP RP 605 Red phosphorus | | 1.50 maximum | |
| Boric acid | 0.5 | 0.5 | 0.5 |
| 2-Phenylimidazole | 2.0 | 2.0 | 2.0 |
| Additional solvent | MEK/Dowanol PM | MEK/Dowanol PM | MEK/Dowanol PM |
| VARNISH CHARACTERISTICS | | | |
| Viscosity (Ford cup #4), sec | 120 | 63 | 60 |
| Reactivity, sec Geltime @ 170° C. @ 150° C. | 77 | 70 | 77 |
| Treater conditions | | | |
| Oven temp. ° C. | 157 | 157 | 157 |
| Winding speed, m/min | 1.3 | 1.4 | 1.5 |
| PREPREG CHARACTERISTICS | | | |
| Resin content, wt. % | 39.5 | 41 | 40.8 |
| Rest Geltime @ 170 c, sec | 23 | 20 | 23 |
| Mil Flow, wt. % | 11.9 | 16.5 | 15.7 |
| LAMINATE PERFORMANCE | | | |
| Laminate cure cycle | 190° C. for 90 mins | 190 for 90 mins | 190 for 90 mins |
| Laminate thickness, mm | 1.45 | 1.55 | 1.45 |
| Glass transition temperature-Tg1/2, C | 166.6/170.74 | 170.2/171.4 | 172.7/171.3 |
| Copper peel strength N/cm | | | |
| NMP-pick-up, % | 0.083 | 0.034 | 0.017 |
| Press Cooker Test, wt. % water pick-up & % passed solder bath @260° C. | wt %/% pass | wt %/% pass | wt %/% pass |
| 60 min. | 100 | 100 | 50 |
| 75 min. | 50 | 100 | 50 |
| 90 min | 0 | 50 | |
| Total burning time, sec | 32 | 29 | 26 |
| UL94 | V-0 | V-0 | V-0 |

What is claimed is:

1. A flame retardant epoxy resin composition containing no more than 10 percent by weight of halogen, comprising
   a) an epoxy resin,
   b) a phosphonic acid ester in an amount such as to provide from 0.2 to 5 weight percent phosphorus in the composition,
   c) a nitrogen-containing cross-linking agent having an amine functionality of at least 2, in an amount of from 10 to 80 percent of the stoichiometric amount needed to cure the epoxy resin such that the composition contains a stoichiometric excess of epoxy resin over the nitrogen-containing cross-linking agent,
   d) from 0.1 to 3 weight percent of a catalyst capable of promoting the reaction of the phosphonic acid ester with the epoxy resin and promoting the curing of the epoxy resin with the cross-linker and, optionally e) a Lewis acid in an amount of up to 2 moles per mole of catalyst.

2. A composition as claimed in claim 1, wherein the epoxy resin has a softening point at least 50 degrees C (by ASTM D3104).

3. A composition as claimed in claim 1 or claim 2, wherein the epoxy resin contains not more than 2 alkyl groups per molecule.

4. A composition as claimed in claim 3, wherein the epoxy resin contains not more than 1 alkyl group per molecule.

5. A composition as claimed in claim 1, wherein the epoxy resin is (i) the reaction product of a monomer containing at least two epoxy groups, and a nitrogen-containing chain-extending monomer, or (ii) a mixture of a monomer containing at least two epoxy groups, and a nitrogen-containing chain-extending monomer.

6. A composition as claimed in claim 1 wherein the composition additionally comprises a difunctional chain-extending monomer.

7. A composition as claimed in claim 5 or claim 6, wherein the difunctional chain-extending monomer is -methylene bis(phenylisocyanate) (MDI), Toluenediisocyanate (TDI), 2,6,dimethylhexylamine, sulfanilamide or anthranilamide.

8. A composition as claimed in claim 7, wherein the monomer containing at least two epoxy groups is a glycidyl ether of a phenol novolac or a glycidyl ether of bisphenol-F.

9. A composition as claimed in claim 1, wherein the amount of the epoxy resin based on solids is from 50–95 weight percent, of the composition.

10. A composition as claimed in claim 9, wherein the amount of the epoxy resin is from 80–90 weight percent of the composition, based on solids.

11. A composition as claimed in claim 1, wherein the phosphonic acid ester is an ester of the formula $$R1-\overset{\overset{O}{\|}}{P}\overset{O-R2}{\underset{O-R3}{}} \quad R4\left[\overset{\overset{O}{\|}}{P}\overset{O-R2}{\underset{O-R3}{}}\right]_2$$

wherein $R^1$ is $C_1$ to $C_3$ alkyl, $R^4$ is $C_1$ to $C_3$ alkylene, $R^2$, and $R^3$, are each $C_1$ to $C_3$ alkyl, or $C_6$ to $C_{10}$ aryl, or $R^2$ and $R^3$ taken together represent the residue of a glycol or a polyol.

12. A composition as claimed in claim 11, wherein $R^1$ is methyl $R^4$ is methylene, and $R^2$, and $R^3$, are each independently methyl, ethyl, phenyl, or hydroxyphenyl.

13. A composition as claimed in claim 1, wherein the phosphonic acid ester is a compound of the formula

[structure of phosphonic acid ester compound with OCH₃ groups] or

[structure of phosphonic acid ester compound, bracketed subscript 2]

14. A composition as claimed in claim 12 or claim 13, wherein the amount of the phosphonic acid ester is from 4 to 15 weight percent of the composition.

15. A composition as claimed in claim 14, wherein the amount of the phosphonic acid ester is from 7 to 15 weight percent of the composition.

16. A composition as claimed in claim 1 wherein the amount of the phosphonic acid ester is such as to provide a phosphorous content in the composition of from 0.5 to 5 weight percent.

17. A composition as claimed in claim 16 wherein the amount of the phosphonic acid ester is such as to provide a phosphorous content in the composition of from 1 to 3.8 weight percent.

18. A composition as claimed in claim 17 wherein the amount of the phosphonic acid ester is such as to provide a phosphorous content in the composition of from 1.4 to 3.1 weight percent.

19. A composition as claimed in claim 1, wherein the nitrogen-containing cross-linking agent having an amine functionality of at least 2 is dicyandiamide, sulfanilamide, diaminodiphenylsulfone, and/or diaminodiphenyl methane.

20. A composition as claimed in claim 1, wherein the total amount of nitrogen-containing compounds in the composition is such as to provide a total nitrogen content of from 1 to 8 weight percent of the composition.

21. A composition as claimed in claim 1, wherein the catalyst comprises a single catalyst component, capable both of promoting the reaction of the phosphonic acid ester with the epoxy resin and of promoting the curing of the epoxy resin.

22. A composition as claimed in claim 1, wherein the catalyst comprises a catalyst component which favors the phosphonic ester—epoxy reaction over the epoxy curing reaction.

23. A composition as claimed in claim 22, wherein the catalyst is 1,8-diazabicyclo (5, 4, 0) undec-7-en.

24. A composition as claimed in claim 1, wherein the total amount of catalyst is from 0.1 to 2 weight percent of the composition.

25. A composition as claimed in claim 1, which also comprises an additional flame retardant additive.

26. A composition as claimed in claim 25, wherein the additional flame retardant additive is an ammonium polyphosphate, red phosphorous, a phosphite, 9,10-dihydro-9-oxa-phosphaphenanthrene-10-oxide (HCA), a phosphazene, a nitrogen containing fire retardant, a halogenated flame retardant, a halogenated epoxy resin, a phosphorus-halogen containing flame retardant, a salt of an organic acid, an inorganic metal hydrate, or a compound containing boron or antimony.

27. A method of preparing a cured fire-retardant epoxy resin comprising curing the epoxy resin composition of claim 1.

28. A method of preparing an epoxy resin composition comprising a) an epoxy resin, b) a phosphonic acid ester in an amount such as to provide from 0.2 to 5 weight percent phosphorus in the composition, c) a nitrogen-containing cross-linking a gent, having an amine functionality of at least 2, in an amount of from 10 to 80 percent of the stoichiometric amount needed to cure the epoxy resin such that the composition contains a stoichiometric excess of epoxy resin over the nitrogen-containing cross-linking agent, d) from 0.1 to 3 weight percent of a catalyst capable of promoting the reaction of the phosphonic acid ester with the epoxy resin, and capable of promoting the curing of the epoxy resin, and optionally e) a Lewis acid in an amount of up to 2 moles per mole of catalyst, which method comprises preparing a first composition comprising the epoxy resin a), and a second composition comprising the curing catalyst d), wherein either the first or the second composition also comprises the phosphonic acid ester b) and the nitrogen-containing cross-linking agent c) and mixing the first composition with the second composition.

29. A method as claimed in claim 28, wherein the phosphonic acid ester, nitrogen-containing cross-linking agent, and catalyst are all present in the second composition.

30. A method as claimed in claim 29, wherein the phosphonic acid ester and nitrogen-containing cross-linking agent are present in the first composition, and the catalyst is present in the second composition.

* * * * *